US006219451B1

(12) United States Patent
Hunt et al.

(10) Patent No.: US 6,219,451 B1
(45) Date of Patent: Apr. 17, 2001

(54) METHOD AND APPARATUS FOR COUNTER BASED LIQUID CRYSTAL DISPLAY PANEL IDENTIFICATION FOR A COMPUTER

(75) Inventors: Darrell M. Hunt, Temple; Ronald D. Shaw, Cedar Park, both of TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/221,915

(22) Filed: Dec. 28, 1998

(51) Int. Cl.[7] .......... G06K 9/74
(52) U.S. Cl. .......... 382/214; 382/209; 345/3
(58) Field of Search .......... 382/209, 214; 345/3, 213, 99

(56) References Cited

U.S. PATENT DOCUMENTS

| | | | |
|---|---|---|---|
| 5,448,697 | 9/1995 | Parks et al. | 395/162 |
| 5,471,225 | 11/1995 | Parks | 345/98 |
| 5,483,260 | 1/1996 | Parks et al. | 345/156 |
| 5,495,263 | 2/1996 | Dalton et al. | 345/3 |
| 5,771,028 * | 6/1998 | Dalton et al. | 345/3 |
| 5,867,717 * | 2/1999 | Milhaupt et al. | 395/250.04 |

OTHER PUBLICATIONS

Morse, "A Method for EMI Evaluation of Notebook Computer Liquid Crystal Panels while Eliminating the Contribution of Computer Generated EMI", IEEE on Inter Symposium, pp. 343–346, 1995.*

* cited by examiner

*Primary Examiner*—Jose L. Couso
*Assistant Examiner*—Anh Hong Do
(74) *Attorney, Agent, or Firm*—Haynes and Boone, LLP

(57) ABSTRACT

A notebook computer system having a base unit, a display panel, and display panel indication circuit for identifying the display panel includes a table of display panel IDs and corresponding display panel identification characteristics stored within the base unit. A display panel indicator circuit is provided for being disposed with the display panel, the display panel indicator including a panel ID unique to the type, resolution, and manufacturer of the display panel, the panel ID further including a prescribed count. The indicator circuit further includes a counter and a comparator. A clock signal is provided from the base unit to the display panel indicator circuit while simultaneously monitoring a clock signal count within the base unit. The clock signal is utilized by the display panel indicator circuit as an input to the indicator circuit counter to count from an initial count and wherein the count of the indicator circuit counter is compared with the prescribed panel ID count using the indicator circuit comparator. A signal is output to the base unit indicative of a count match upon the counter count becoming equal to the panel ID count. The clock signal from the base unit to the indicator circuit is disabled upon a recognition of the match signal by the base unit, and the monitored clock signal count is used within the base unit for accessing a corresponding panel ID in the table of display panel ID, further for obtaining corresponding display panel identification characteristics.

30 Claims, 3 Drawing Sheets

| ID COUNT | LCD PANEL IDENTIFICATION CHARACTERISTICS |
|---|---|
| ⋮ | ⋮ |
| 115 | SHARP, SVGA, TFT |
| 116 | SHARP, SVGA, STN |
| 117 | SHARP, XGA, TFT |
| ⋮ | ⋮ |
| 181 | SAMSUNG, SVGA, TFT |
| 182 | SAMSUNG, SVGA, STN |
| 183 | SAMSUNG, XGA, TFT |

METHOD AND APPARATUS FOR COUNTER BASED LIQUID CRYSTAL DISPLAY PANEL IDENTIFICATION FOR A COMPUTER

BACKGROUND

The present disclosure relates generally to computers, and more particularly, to a method and apparatus for the identification of liquid crystal display panels for notebook computers.

Notebook computer manufacturers use a variety of LCD panel types and vendors in the manufacture of notebook computers to reduce cost and to increase production levels. In addition, each type of LCD panel typically have unique operational timing and include other operational considerations as well. This requires that each LCD panel model have a unique Panel ID (i.e., panel identification), wherein the panel identification provides an indication of the LCD panel resolution and type. Still further, for a given single notebook computer model, the computer model may have a large number (e.g. as many as twenty four (24) or more) unique Panel IDs for the LCD panels which are used with that particular computer model. In addition to identifying panel type and resolution, it would also be desirable to identify the vendor associated with a given LCD panel display from the Panel ID.

Currently, there are two basic methods in common use to obtain the Panel ID, including dedicated Panel ID lines and multiplexed Panel ID lines. With the use of dedicated Panel ID lines, the number of connections between the LCD panel and the computer increases. With respect to the multiplexed lines, the multiplexed Panel ID lines work as dedicated lines at certain times. To establish 24 Panel IDs would require at least five (5) dedicated lines and input/output (I/O) pins encoded with respective identification values. The later presents additional cable design challenges.

In prior systems, an LCD panel type has been indicated by providing a number of additional pins from the LCD panel to the base unit of the notebook computer system. Thus, by encoding the additional pins with certain values, the computer is able to determine the type of LCD panel being used. A disadvantage of this method, however, is that a number of extra wires are required to be routed from the LCD panel to the base unit of the notebook computer system. Further, as the number of panels that can be used with a given notebook computer system changes, so must the number of pins. Thus pin and wiring limitation problems and increased costs are quickly reached. Logistical and standardization problems with LCD panel vendors also occur.

In a prior system, four (4) dedicated panel ID lines were used to identify up to 16 different LCD panels. If additional LCD panel manufacturers beyond sixteen were to be enlisted for supplying panels for the given model of notebook computer, then the number of available unique LCD panel identifications is quickly used up.

To further illustrate the problem in the art, currently, dedicated lines are used which extend from a video controller, located in the base unit of the notebook computer, to a flex cable or ribbon cable which connects to the LCD panel. In other words, the flex cable extends from the LCD panel to the video controller on the system board or motherboard of the base unit. The dedicated lines are either pulled high (+Vcc) or low (GND) to indicate a logical one "1" or a logical zero "0", respectively. With four dedicated lines, then a limit of sixteen (16) different LCD panel IDs are possible. The four dedicated lines take up space on the flex cable. In addition, the extra dedicated lines present a mechanical space problem, since it would be most desired to keep the flex cable as small and narrow as possible for assistance with a mechanical design of the hinges used for attaching the LCD panel to the base unit of the notebook computer. Thus, mechanical space limitations are a concern. Still further, with the nature of some signals in the flex cable which pass by the static lines (i.e., static lines including the dedicated panel ID lines), there might be electromagnetic interference (EMI) undesirably transferred onto the static lines. It is thus desired to reduce the pin count required for establishing necessary connections between the LCD panel and the base unit of the notebook computer, however, while at the same time increase the number of panels to be supported. For example, to support 32 panels, additional lines would be needed using the prior known identification methods. With the prior methods and apparatus, computer board space and cable space are undesirably taken up.

In U.S. Pat. No. 5,495,263, issued Feb. 27, 1996 and entitled "Identification of Liquid Crystal Display Panels", a method is disclosed for identifying the type of LCD panel used in a portable computer system based on the frequency of an oscillator signal of a DC-to-AC inverter located in the LCD panel. The '263 method relies upon the oscillator signal frequency to drive a system counter located in the base unit of the computer. However, the '263 method is subject to imperfections and variations. For example, components tend to drift over time and with varying temperatures. As a result, the oscillator signal of the LCD panel is subject to variation. In addition, the '263 method relies upon the use of a non-deterministic frequency. That is, the frequency is not an absolute and is subject to fluctuation. Errors can thus occur in panel identification as a result of quite a bit of variation in measured frequency. In addition, the '263 method uses an ASIC (application specific integrated circuit) for the video controller for panel identification purposes, however the use of an ASIC is not conducive or readily alterable as a standard solution. Furthermore, the '263 method relies upon one way oscillator signal transmission from the LCD panel to the base unit and does not utilize any feedback during a panel identification.

A method and apparatus of identifying the LCD panel resolution, type and a respective vendor is thus desired which does not require unnecessary additional pins or components. It is further desired that panel type and respective vendor be accurately determinable.

SUMMARY

One embodiment, accordingly, provides a notebook computer system having a base unit, a display panel, and display panel indication for identifying the display panel, and further including a table of display panel IDs and corresponding display panel identification characteristics stored within the base unit, the identification characteristics including a type, resolution, and manufacturer. A display panel indicator circuit is disposed with the display panel, including a panel ID unique to the type, resolution, and manufacturer of the display panel wherein the panel ID includes a prescribed count. The display panel indicator circuit further includes a counter and a comparator for comparing a count of the counter with the prescribed panel ID count. Means are included for providing a clock signal of high and low states from the base unit to said display panel indicator circuit while simultaneously monitoring a clock signal count within the base unit. The clock signal is utilized by the display panel indicator circuit as an input to the display panel indicator circuit counter to count from an initial count. The count of the display panel indicator circuit counter is compared with the prescribed panel ID count using the display panel indicator circuit comparator. A signal is output to the base unit indicative of a count match upon the counter count becoming equal to the panel ID count. Means are included for disabling the providing of the clock signal from the base unit to the display panel indicator circuit upon a recognition of the match signal by the base unit, and using the monitored clock signal count within the base unit for accessing a corresponding panel ID in the table of display panel ID, further for obtaining corresponding display panel identification characteristics.

The present embodiments advantageously enable the identifying of hundreds of LCD panels and/or LCD panel combinations, including type, resolution, and manufacture, with the use of either a single signal line or two signal lines. The present embodiments advantageously keep the line and pin-count requirement for LCD panel identifications to a minimum.

DETAILED DESCRIPTION

Figure 1:
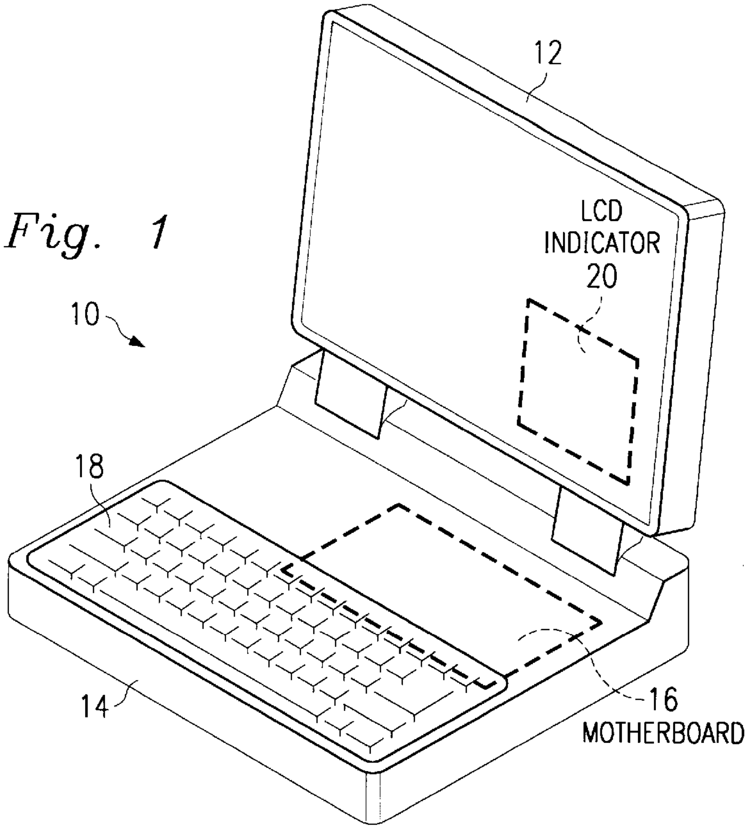
FIG. 1 illustrates an exemplary notebook computer including the LCD panel identification method and apparatus according to the present disclosure.

With reference now to FIG. 1, the method and apparatus of the present disclosure advantageously enables a notebook computer 10 to readily and accurately identify the LCD panel 12 attached to it. In addition, the LCD panel manufacturer or vendor can be readily identified also. The notebook computer 10 includes a base unit 14, LCD panel 12, motherboard 16, keyboard 18, and LCD panel ID indicator 20. Notebook computer 10 includes other components not mentioned herein for the sake of simplicity.

As discussed herein above, not only are there a number of different types of LCD panels, there are also a number of manufacturers of LCD panels. It is to the advantage of the notebook computer manufacturer to know which manufacturer's LCD panel is being (or has been) installed on a notebook computer, and the corresponding type of LCD panel, during a manufacturing and servicing of the same. For instance, a computer manufacturer may source LCD panels from multiple LCD panel manufacturers, which might include SAMSUNG, SHARP and numerous others. In addition, sometimes there may be a certain amount of fall out on panels (i.e., a certain percentage of defective panels). Upon an occurrence of panel fall out, it is desirable for the computer manufacturer to be able to narrow the fall out down to the particular LCD panel manufacturer. Fall out refers to defective panels or those panels which are found to be unusable because of manufacturer defects. The present method and apparatus advantageously addresses this concern. Accordingly, not only does the present method and apparatus determine the type and resolution of LCD panel, but the manufacturer also.

Panel identification as identified by the LCD panel ID indicator of the present disclosure includes resolution, type, and manufacturer. Resolution may include one of the following: SVGA (800×600 resolution), XGA (1024×768 resolution), SXGA (1280×1024 resolution) or others, as may be developed in the future. Panel display type may include: TFT (thin film transistor), STN (single twist pneumatic) or others. The parameter of manufacturer can include any given number of manufacturers of LCD panels, for example, from four (4) to twenty (20), or more. LCD panel identification can thus be tailored to various resolutions, various types and any given number of manufacturers. As a result, there could be hundreds (100's) of possible panel identifications.

To further illustrate the above discussion, for instance, let's assume that for a particular notebook computer model, two types of LCD panels are used. The types include TFT and STN. Resolutions include SVGA, XGA, and XSGA. In addition, let's assume that there are two LCD panel manufacturers who each supply the two types of LCD panels, resolutions or combinations thereof.

FIG. 1 shows an LCD panel 12 having an LCD panel ID indicator 20 according to the present disclosure embodied therein. The LCD panel ID indicator 20 is coupled to video controller 40 (FIG. 5) inside the base unit 14 of the notebook computer 10. As mentioned, the embodiments of the present disclosure can be advantageously used for identifying hundreds of LCD panels and/or LCD panel combinations.

The solution to the problems in the art outlined herein above is advantageously achieved through use of a counter based implementation, of which two lines or one line could be used by an LCD panel indicator 20 to represent any number of panels, up to an almost limitless number. For example, it might be desirable to have the ability to identify up to 256 panels. As mentioned, with the embodiments of the present disclosure, either two signal lines or one signal line are used, depending on the desired implementation.

Figure 2:
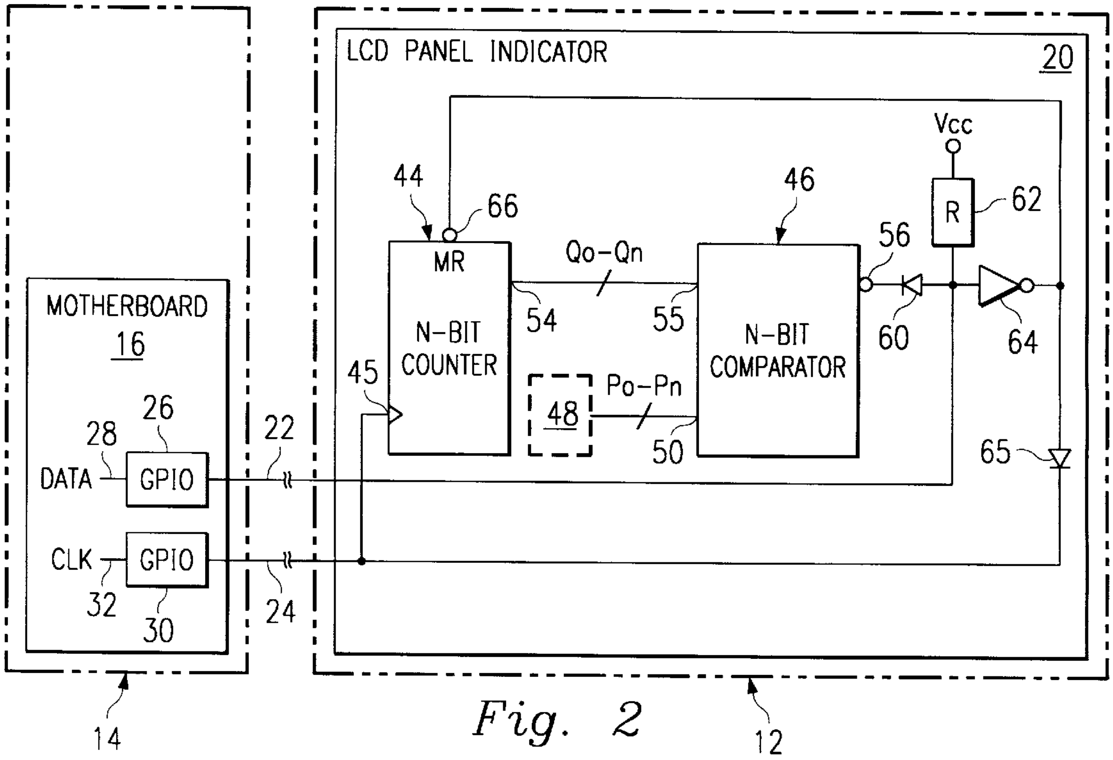
FIG. 2 illustrates one embodiment of the LCD panel identification method and apparatus using two signal lines according to the present disclosure.

Turning now to FIG. 2 an embodiment of the LCD indicator 20 which employs two signal lines 22 and 24 is shown. One line 22 is a data line. The other line 24 is a clock line. In the embodiment of FIG. 2, one GPIO (general purpose input output) port 26 or pin is assigned to handle the inputting of data 28 and one GPIO port 30 or pin is assigned to handle the outputting of a clock 32. In a preferred embodiment, the GPIO lines originate from the motherboard 16 or another system board within the base unit 14 of the notebook computer 10.

Figure 3:
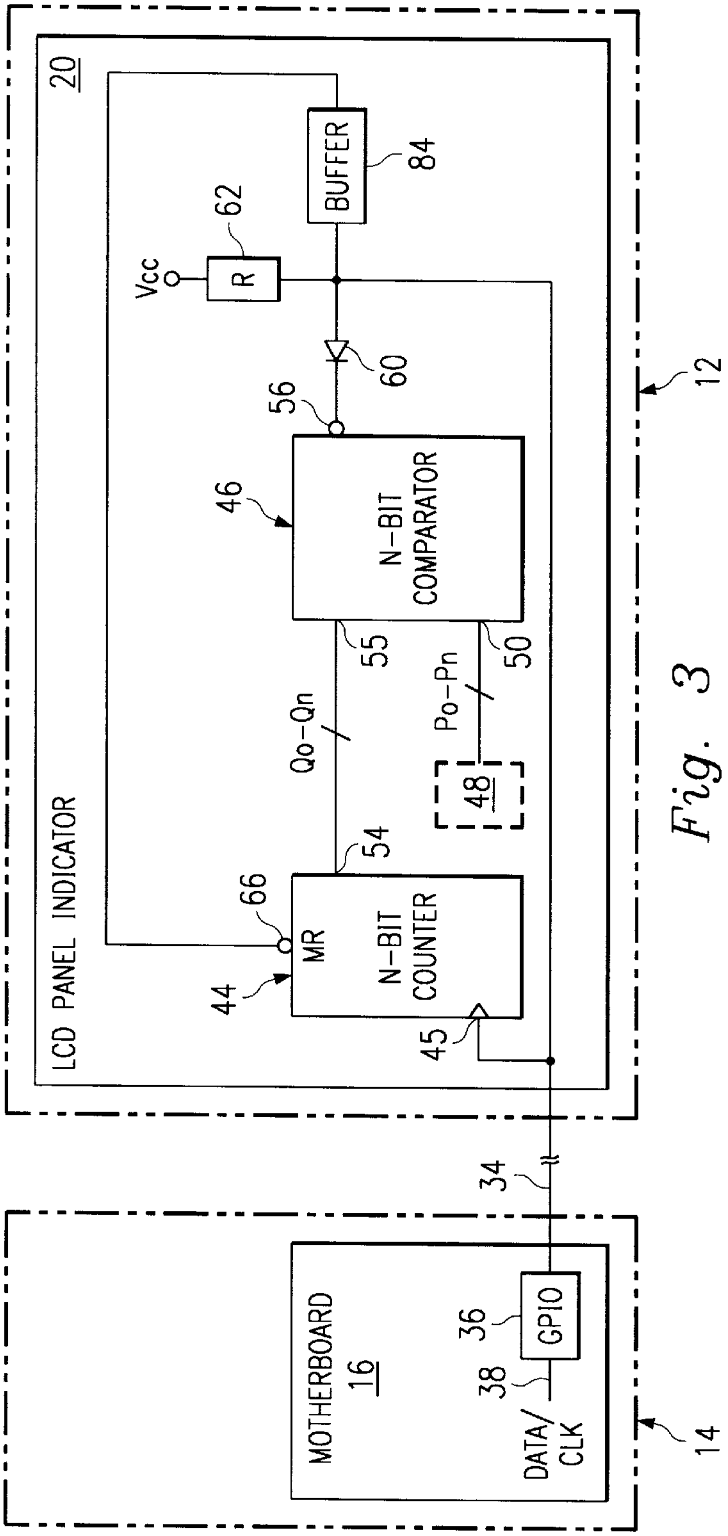
FIG. 3 illustrates another embodiment of the LCD panel identification method and apparatus using a single multiplexed signal line according to the present disclosure.

Referring briefly to FIG. 3, another embodiment of LCD indicator 20 which employs a single signal line 34 is shown. The single signal line 34 is used for both the data and clock, as will be further discussed below. The data/clock signal 38 is multiplexed from the motherboard 16 via a GPIO (general purpose input output) port 36 or pin. The GPIO port 36 or pin is toggled back and forth between inputting data and outputting a clock, as will be discussed further herein below.

Referring back to FIG. 1, the LCD panel ID indicator 20 is positioned within or on the LCD display panel assembly 12. Preferably, the panel manufacturer includes the LCD indicator 20 with the LCD panel 12 when supplying the LCD panel 12 to the computer manufacturer. Alternatively, the LCD panel ID indicator 20 can be placed on a board (not shown), which is interfaced with the panel 12 subsequent to delivery to the computer manufacturer. For example, upon receipt of a shipment of LCD panels from a given LCD panel manufacturer, where the LCD panel is shipped without an ID indicator, the computer manufacturer can incorporate LCD panel ID indicators according to the present disclosure with a respective LCD panel.

The LCD panel ID indicator 20 is coupled to the motherboard 16 or system board of the base unit 14 as discussed herein. A video controller 40 (FIG. 5) is coupled via signal lines 42 to the LCD panel 12 for providing appropriate driving signals to the LCD panel. The video controller 40 provides the appropriate drive signals in response to an identification of the LCD panel ID by the LCD panel indicator 20 and system software. In addition, the LCD panel ID indicator 20 may also be coupled directly to the video controller 40.

Figures 4, 5:
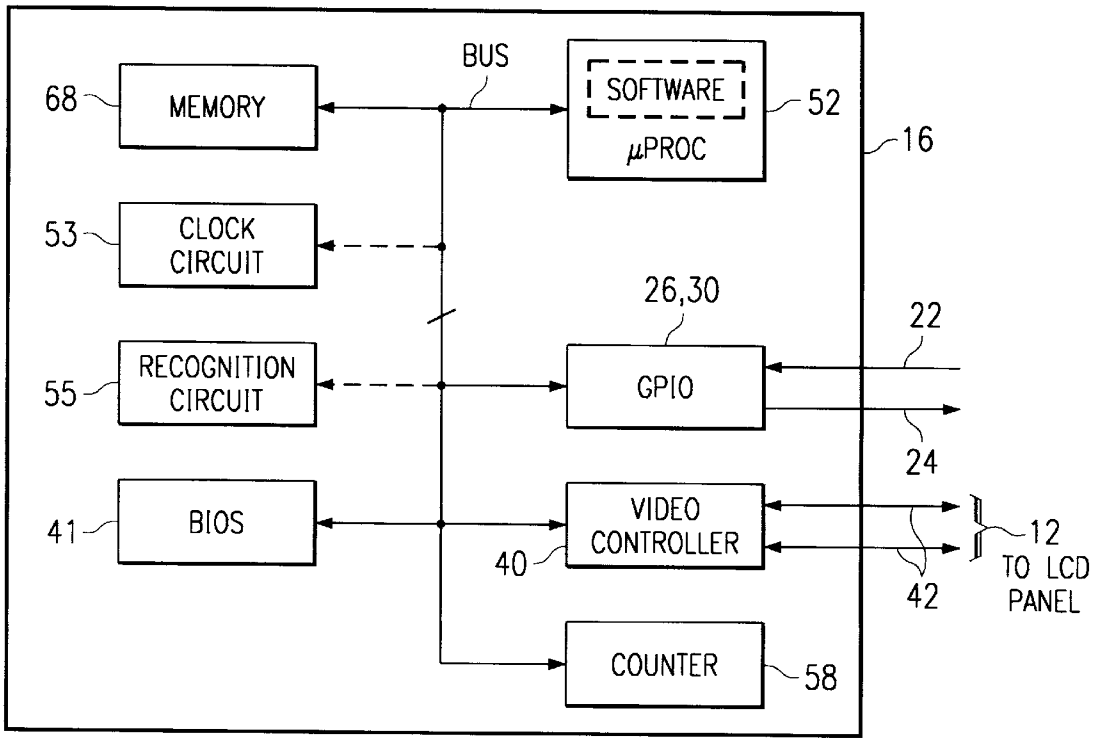
FIG. 4 illustrates a table of exemplary LCD panel identification characteristics, including vendor information, and identification counts for several LCD panels.
FIG. 5 illustrates in block diagram form various components of the base unit utilized with the LCD panel identification method and apparatus of the present disclosure.

Referring once again to FIG. 2, the LCD panel identification system or ID indicator of the present disclosure includes a counter 44 and a comparator 46. Counter 44 includes any suitable n-bit counter. Comparator 46 includes any suitable n-bit comparator. Each manufacturer of the LCD panels is assigned a prescribed number, for a given resolution and type of LCD panel such as shown in FIG. 4. For illustration, assume that the prescribed number is 115. The LCD panel manufacturer would then tie or connect the inputs 48 (Po-Pn) of the comparator 46 in a manner so as to yield the number 115 at one input 50 of the comparator 46. The comparator 46 can operate on any number of bits, the number of bits being as large or as small as is necessary for obtaining a particular identification number. Each bit of the ID input 50 of the comparator 46, least significant bit to most significant bit, will be tied high or low to provide a prescribed LCD panel identification number. In our example, the ID input would be preset to yield 115.

With reference now to FIGS. 1, 2, and 5, when the notebook computer 10 is powered on, microprocessor 52 is programmed with suitable instructions for issuing a clock signal of 1, 0, 1, 0, etc. on clock output line 24. The clock signal could also be generated by video controller 40 or a clock circuit 53 (FIG. 5), wherein clock circuit 53 can include any suitable discrete clock circuit for providing the desired clock functions. In response to the clock signal on line 24, the counter 44 of the LCD panel ID indicator 20 starts counting. Counter 44 counts from an initial count, all the way up to a prescribed count equal to the unique panel ID number assigned to the particular LCD panel 12. In our example, when the count reaches 115, then the counter output 54 (Qo-Qn) matches the prescribed count (Po-Pn) of the given LCD panel 12 for that particular resolution, type, and LCD manufacturer. Upon achieving the prescribed count, a reset occurs at the output 56 of the comparator 46. The reset clears the counter 44 of the LCD panel ID indicator 20. A signal is also sent back to the video controller 40 via the data line 22 and GPIO port 26, which might be set to a high state to indicate a match, for example. Intermittent with the outputting of clock pulses on line 24, the video controller 40 polls the GPIO port 26 for the data signal 28. Upon seeing a prescribed signal at the GPIO port 26 via the data signal line 22, the video controller 40 determines that counting is finished. Once the video controller 40 establishes that counting is finished, the video controller 40 then looks at how many clock pulses were sent out over the clock output line 24. The number of clock pulses sent out, is equivalent to the identification number established for the LCD panel ID, further as reflected by the status of a system counter 58 (FIG. 5) which is internal to the base unit 14. In one embodiment, system counter 58 is implemented via suitable system software, further for being incremented each time a complete clock pulse is output to indicator 20. System counter 58 could also be implemented by the video controller 40 or clock circuit 53. In addition, recognition of the prescribed match signal 28 at GPIO port 26 could be accomplished using a signal recognition circuit 55 (FIG. 5), wherein recognition circuit 55 can include any suitable signal sensing and/or recognition circuit. Keeping with our example, the video controller thus determines that the system count is at 115, which represents a particular manufacturer and LCD panel. Determination of the count by the video controller 40, as described above, can be handled by appropriate software stored in the video BIOS (Basic Input/Output System) 41 of the video controller or computer system itself. The software includes suitable functions for looking at the system count which was just obtained and then determines from a table, for example as shown in FIG. 4, that the count 115 corresponds to a given LCD resolution, type, and manufacturer.

As mentioned above, the video BIOS 41 can perform the function of counting up the system count. The video BIOS 41 receives the match indication or bit through the data signal line 22 and corresponding GPIO port 26. The match indication or bit indicates to the video BIOS 41 that there is a match, thus stop the system counter. The video BIOS, upon receiving the match bit, stops the system count and inquires how many times did the system counter 58 count up. In our example, the system counter would have counted up to 115. The count of 115 corresponds to a SHARP, SVGA, TFT LCD panel according to the exemplary table of LCD panel ID's and corresponding panel data of FIG. 4. The video BIOS then loads all necessary characteristics of the SHARP SVGA, TFT LCD panel from system memory and proceeds to boot up the computer system. The notebook computer system 10 is then ready to be used for computing purposes, as may be desired by the computer user. Such an LCD panel identification method provides a quick and accurate way of determining a unique LCD panel identification. As additional LCD panels are selected and/or used for a particular model of notebook computer by a computer manufacturer, unique panel IDs can be easily added and accommodated.

Subsequent to manufacture and in the event an LCD panel failure occurs, a notebook computer may require service in which a service technician would need to change out the LCD display. The replacement LCD panel may be different from the original panel. In addition, the replacement LCD panel may also be from a different manufacturer, etc. The notebook computer can then use the panel identification method and apparatus as described herein to identify the replacement LCD panel and issue video controller process signals accordingly. The present method and apparatus advantageously utilize a minimum of resources to identify an LCD panel.

The present method and apparatus furthermore advantageously keep the line and pin-count requirement for LCD panel identification to a minimum. In addition, with a minimum line and pin-count, a flex cable required for interconnection between the base unit and the LCD panel can be kept to a minimum size to assist with mechanical and EMI challenges.

Because of the nature of the LCD panel identifier 20 of the present disclosure, the situation of running out of available panel IDs when additional LCD panel manufacturers are added to the list of LCD panel manufacturers used by a computer manufacturer is avoided. In other words, the previous problem with the allocation of panel IDs to numerous LCD panel manufacturers becomes a moot problem. For a further understanding, let's assume that the computer manufacturer is manufacturing notebook computers of a particular model. An unexpected increase in the number of notebook computer orders are received, resulting in exhaustion of an initial supply of LCD panels from a first LCD panel manufacturer. A further supply of LCD panels is unavailable from the first panel manufacturer; however, a supply of LCD panels is readily available from a second LCD panel manufacturer. Using the method and apparatus of the present disclosure, identification of the LCD panels from the second LCD panel manufacturer can be readily accomplished with a minimum of effort and resources. In addition, computers manufactured with panels from the first LCD panel manufacturer can be readily identified and distinguished from those panels manufactured by the second LCD panel manufacturer.

Turning again to FIG. 5, the video controller 40 uses the LCD panel identification information to know what type of LCD panel control to implement for operation of the LCD panel display 12 (FIG. 1). For instance, the resolution tells the video controller 40 to send out certain control signals to the LCD panel 12, e.g. timing and refresh. The type of display tells the video controller 40 how to control the way that video data is delivered to the LCD panel. The identification of the LCD panel manufacturer is helpful for the computer manufacturer's quality process. In the later instance, knowing the LCD panel manufacturer assists the computer manufacturer to keep track of yield or falling out problems. The first two parameters are for the purpose of ensuring proper operation of the LCD panel. The last parameter is for helping to keep quality in bound with respect to the computer manufacturing process (i.e., a quality parameter).

With respect to the GPIO ports 26 and 30 mentioned above, GPIO ports are generally disposed on the video controller or some other controller within the base unit 14 of the notebook computer 10. When the GPIO port is on a controller other than the video controller 40, the GPIO port can be coupled to communicate directly with the microprocessor 52 or the video controller 40 (FIG. 5). In any case, the data received is appropriately passed to the video controller 40 via suitable means.

With reference again to FIGS. 1 and 2, as noted herein, LCD panel ID parameters include resolution, type, and manufacturer. At power up, a clock signal 32 is sent from the base unit 14 to the LCD panel ID indicator 20 to initiate counting with the n-bit counter 44. There is stored within the LCD panel ID indicator 20 a count 48 (Po-Pn) which uniquely identifies the resolution, type, and manufacturer of the LCD panel. The n-bit counter 44 is clocked at input 45 with the clock signal output 24 from the base unit 14. As the n-bit counter 44 is clocked, the counter output 54 is input into the n-bit comparator 46. The n-bit count of the counter 44 is compared with the unique n-bit LCD panel identification 48. Counting by the counter 44 continues until the n-bit count (Qo-Qn) is equal to the unique n-bit LCD panel identification (Po-Pn). At that point, the output 56 of the comparator 46 changes state, either from high to low, or from low to high, indicative of a match. As shown, the comparator output 56 is an inverted output; however, the output could be a non-inverted output with appropriate logic, as necessary.

In the embodiment of FIG. 2, the inverted output 56 of comparator 46 provides a high to low transition upon a match. A diode 60 is inserted at the inverted output 56. With a normal state of the GPIO ports typically at Vcc or high, a high to low transition at the inverted output 56 of the comparator 46 provides an indication that a change has occurred in the output. The inverted output 56 of the comparator 46 is normally in a high state or logical "1". It should be understood that an alternate implementation with reversed logic can also be used to accomplish the providing of an indication of a match. Furthermore, in the embodiment of FIG. 2, the data GPIO port 26 input line 22 is set to a logical "1" or in a high state, for example, via resistor 62 tied to Vcc at the LCD indicator 20. Setting of the data line 22 to the high state occurs prior to or while the n-bit counter 44 is counting, but not yet reached the prescribed count. When the counter output 54 equals the preset LCD panel identification 48, then the output of the comparator 46 changes its state. For instance, the comparator changes state from high to low on the inverted output 56. A second inverter 64 may be provided which inverts the inverted comparator output 56, further which resets the counter 44 at reset 66. The counter 44 thus gets automatically reset at the end of each total count.

With reference still to FIG. 2, clock GPIO port 30 is normally low and gets clocked high. That is, the clock GPIO output port 30 gets pulsed between low and high. The data line GPIO port 26 gets tied high, however the data line 22 is pulled low by the inverted output 56 of the comparator 46 when the inverted output of the comparator goes low. The signal at the GPIO data input port 26 remains in the high state until a count match occurs, as indicated by the output 56 of the comparator 46. Comparator 46 also includes a non-inverted output (not shown) which is normally low. Upon a match, the non-inverted output (not shown) of comparator 46 goes high. On the other hand, the inverted output 56 of the comparator 46 is normally high and upon the occurrence of a count match, the inverted output 56 goes low. The low state gets fed back to the data GPIO 26, indicative that a match has occurred. Upon receipt of the low at the GPIO port data line 28, the system software recognizes the same and then terminates any further clock pulses at the clock GPIO signal line 32. The system software monitors the state of the GPIO port data line 28. A change of state in the GPIO port data line 28 thus provides an indication to the system software that a match has occurred and counting can be terminated.

When the data signal line GPIO port 26 goes low, the inverter 64 ties the GPIO output clock line 24 high, thus preventing any further counting by the n-bit counter 44 of the LCD indicator 20. The later acts as a fail safe measure, preventing any undesired race condition with respect to the GPIO output clock 32 of the system board 16 and the n-bit counter 44 of the LCD indicator 20 when a match has occurred and is being processed by the software and video controller 40 of the base unit 14. To provide a desired operation, diode 65 is coupled between the output of inverter 64 and clock line 24. The GPIO ports are tri-statable devices. The data line GPIO port 26 is set up as an input only line in the embodiment shown in FIG. 2.

Upon recognition of a match by the system software 52, the system software disables the clock GPIO output port 30 and then determines how many clock pulses were issued to the LCD indicator 20, i.e., the number of clock pulses needed to match the number which corresponds to the LCD panel identification number 48 stored in the LCD indicator 20. With knowledge of the count, the system software 52 then looks up the LCD panel identification from a look-up table stored in memory 68 on the system board 16. From the look-up table, the system software 52 obtains the LCD parameters corresponding to the LCD panel 12 which is coupled to the base unit 14. Having identified the LCD panel 12, the video controller 40 can then take appropriate actions for controlling the LCD panel according to the particular LCD panel requirements.

As indicated above, the embodiment of FIG. 2 includes individual dedicated data and clock signal lines 22 and 24, respectively. The dedicated data line 22 provides the indication of match or no match, depending on the state of the line. The embodiment of FIG. 3 however includes a multiplexed data/clock signal line 34. The GPIO port 36 in the embodiment of FIG. 3 is used as both an input and an output.

Referring again to FIG. 2, as mentioned above, the inverter 64 also provides a reset signal to the reset input 66 of the counter 44 of LCD indicator 20. The reset signal assures that the n-bit counter 44 starts counting from an initial count. Without the reset, a spurious and/or erroneous count could possibly result. Thus, whenever there is a match of the n-bit counter count 54 with the prescribed unique LCD panel identification number 48, the n-bit counter 44 is reset accordingly.

In summary, the LCD panel ID indicator 20 of FIG. 2 includes an n-bit counter 44 and an n-bit comparator 46. The output 56 of the n-bit comparator 46 is used to indicate when a match occurs, the signal being sent to the GPIO port 26 via the data line 22. A change in the output state of the comparator 46 output 56 provides the indication of a match condition as discussed. Upon the occurrence of a match, the clock line 24 is held in one state (either high or low) to prevent any further counting by the n-bit counter 44 of the LCD indicator 20. In addition, the n-bit counter 44 gets reset to an initial count. A suitable logic device, such as inverter 64, is used to provide the necessary state required to reset the counter 44. In addition, a suitable device provides the prescribed LCD panel identification count 48 which is one input 50 of the comparator 46. Such a suitable device may include a memory having the panel identification count encoded therein or an n-bit dip switch having the panel identification count encoded therewith. Other configurations for the setting of the LCD panel identification at the input 50 of the comparator 46 are possible. Preferably, the LCD panel identification is established and initialized by the LCD manufacturer for a given supply of LCD panels.

With reference now to FIG. 3, the LCD indicator 20 operates in a similar manner as described above with respect to the embodiment of FIG. 2, and further as discussed below. For instance, the LCD indicator 20 includes an n-bit counter 44 with an output 54 coupled to an input 55 of an n-bit comparator 46. Another input 50 of the n-bit comparator 46 is tied to a particular n-bit ID 48 for the given LCD panel. The major difference is that a single line 34 is used for both data and clock. Changes are implemented in the system software 52 to utilize the single data/clock line to clock the n-bit counter 44 and to determine when a match has occurred.

Figure 6:
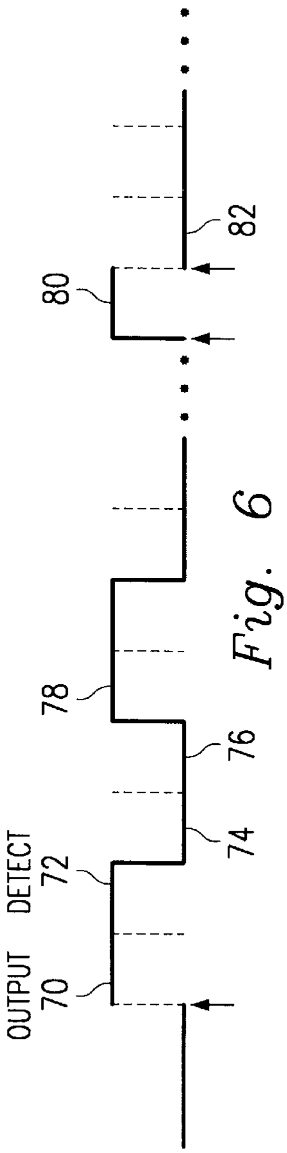
FIG. 6 illustrates a timing diagram of the operation of the embodiment of FIG. 3.

Furthermore, with the embodiment of FIG. 3, the system software 52 is modified in the following manner. Referring also to FIG. 6, when the system software 52 executes an instruction to send out a clock pulse (indicated by reference numeral 70 of FIG. 6), the software temporarily stores and/or remembers the state or pulse that was sent out. The software then reads the condition from the data line 34 (as indicated by reference numeral 72 of FIG. 6) to see if the condition is still true (i.e., unchanged). In other words, if a high to low clock pulse is to be sent, first a high state 70 is placed on the clock line 34. Before sending out the low state 74, the data line 34 is checked to see if the data/clock signal line 34 is still high 72. If the data/clock signal line 34 is high at 72, then the low state is sent at 74. Prior to sending out the next clock high at 78, the data/clock signal line 34 is checked at 76 to see if it is still in the low state. This process continues until there is a change in the state of the data/clock signal line 34, corresponding to a change in the state of the clock which was sent on the data/clock signal line 34 and a subsequent state of the data. A match is indicated by the fact that the data/clock line 34 is held in the opposite orientation or state from that which was previously sent. For example, if a high state at 80 (FIG. 6) was sent on the data/clock signal line 34 and a low state at 82 was read subsequent to the sending of the high state at 80, then a match has occurred. Counting on the n-bit counter 44 is then complete. The system software 52 then determines how many counts occurred for obtaining the match, upon which the corresponding LCD panel identification and parameters are obtained for use by the video controller 40 as discussed herein above with respect to the embodiment of FIG. 2.

The embodiment of FIG. 3 thus utilizes only a single signal line 34. The single signal line 34 is used for both clocking and for indicting a match or no match condition of the n-bit comparator 46. The software 52 checks the GPIO port location of the data/clock signal line 34 to see if the signal line is the same as the clock state last written to the GPIO port, i.e. previously sent. As discussed, if the last written clock state was a "1" and the read state is a "1", then the software proceeds by writing a "0" to the GPIO port to be sent to the LCD indicator circuit 20 for the clocking of the LCD indicator counter 44. On the other hand, if the last written clock state was a "1" and the read state of the GPIO port is a "0", then the software 52 knows that a match has occurred.

Still referring to FIG. 3, described in a different manner, the GPIO port 36 is multiplexed for use as the clock output and the data input. For each clock pulse, the system software 52 instructs the GPIO port 36 to output a given state, for example, high or a logical "1". The system software 52 then reads the state of the GPIO port 36 after a given period of time. If the data is still high or "1", then the system software 52 proceeds with the issuing of a low or logical "0" for clocking counter 44. The system software 52 then looks at the state of the GPIO port data line 34 to see if the line is still low or "0". If the line is still low, then the software issues a high output from the GPIO port, and the process repeats itself. This continues until the reading of a state which is different from that which was sent. That is, if a high was sent and the data read was a low, then a match has occurred between the n-bit counter output 54 and the n-bit panel identification 48 of the LCD panel indicator 20.

The GPIO port 36 outputs high or low signal states in a clocking fashion for clocking the n-bit counter 44 of the LCD panel indicator 20. Note that the GPIO port 36 is a tri-state device. During a clock state output, the GPIO port 36 is controlled for outputting a given state. During a data read, the GPIO port 36 is controlled for inputting a signal state. The GPIO port 36 can also be tri-stated when the signal on the GPIO port is to be held in a prior condition or state. The GPIO port 36 can also be reset as needed. Control of the GPIO port 36 is accomplished via software using techniques known in the art.

As discussed, with the embodiment of FIG. 3, the system software 52 causes a clock signal sequence of high, low, high, low, etc. to be output to the LCD indicator 20 via the GPIO port 36. The GPIO port 36 is tri-stated on an input request, that is, when the system software wants to see what the state of the data line is. When the tri-state condition is different from that which was previously sent, then the system knows not to send any further clock pulses to the counter 44 of LCD indicator 20. No further clock pulses are then sent. A match has been attained between the counter count 54 and the LCD panel identification count 48. The system software 52 then determines the number of clock pulses which were required to achieve a match in the LCD indicator 20, the system software 52 determining the count internal to the base unit 14. Upon determination of the count, the software 52 looks to the look-up table for obtaining the LCD panel characteristic parameters corresponding to the LCD panel ID determined according to the present disclosure. The video controller 40 then uses the characteristic parameters for initializing and controlling an operation of the LCD panel 12 according to its respective requirements.

Still further, referring to FIG. 3, the comparator's inverted output 56 is coupled to the cathode of diode 60. The anode of diode 60 is coupled to a resistor 62 which is coupled to voltage Vcc. The anode of diode 60 is further coupled to the data/clock signal line 34, which is coupled to the GPIO port 36. A buffer 84 is further coupled to the anode of diode 60, wherein the buffer 84 provides a suitable reset signal to the reset input 66 of counter 44 of the LCD indicator 20 for resetting the counter 44 as discussed herein above. Note that the buffer 84 may or may not be necessary, which is determined according to the requirements of the particular circuit implementation.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed:

1. A notebook computer system having a base unit, a display panel, and display panel indication for identifying the display panel, said computer system comprising:

a table of display panel IDs and corresponding display panel identification characteristics stored within the base unit, the identification characteristics including a type, resolution, and manufacturer;

a display panel indicator circuit for being disposed with the display panel, said display panel indicator including a panel ID unique to the type, resolution, and manufacturer of the display panel, wherein the panel ID includes a prescribed count, said display panel indicator circuit further including a counter and a comparator, the comparator for comparing a count of the counter with the prescribed panel ID count;

clock signal circuit for providing a clock signal of high and low states from the base unit to said display panel indicator circuit while simultaneously monitoring a clock signal count within the base unit, wherein the clock signal is utilized by said display panel indicator circuit as an input to the display panel indicator circuit counter to count from an initial count and wherein the count of the display panel indicator circuit counter is compared with the prescribed panel ID count using the display panel indicator circuit comparator, wherein a signal is output to the base unit indicative of a count match upon the counter count becoming equal to the panel ID count; and match signal recognition circuit for disabling the providing of the clock signal from the base unit to said display panel indicator circuit upon a recognition of the match signal by the base unit, and using the monitored clock signal count within the base unit for accessing a corresponding panel ID in said table of display panel ID, further for obtaining corresponding display panel identification characteristics.

2. The computer system of claim 1, wherein the counter of said display panel indicator circuit includes an n-bit counter having an output and the comparator of said display panel indicator circuit includes an n-bit comparator, the output of the n-bit counter being a first input to the comparator and the prescribed panel ID count being a second n-bit input to the comparator.

3. The computer system of claim 2, further including:

reset circuit for resetting the n-bit counter to an initial state upon the occurrence of a match output by the n-bit comparator.

4. The computer system of claim 1, further comprising:

a first dedicated signal line for providing the clock signal from the base unit to said display panel indicator circuit; and a second dedicated signal line for providing the match signal from said display panel indicator circuit, said second dedicated signal line being different from said first dedicated signal line.

5. The computer system of claim 4, still further comprising:

a first general purpose input-output GPIO port in the base unit for outputting the clock signal from the base unit to said display panel indicator circuit on said first dedicated signal line, and a second general purpose input-output GPIO port in the base unit for inputting the match signal provided from said display panel indicator circuit on said second dedicated signal line.

6. The computer system of claim 1, further comprising:

a dedicated signal line for providing the clock signal from the base unit to said display panel indicator circuit and further for providing the match signal from said display panel indicator circuit to the base unit, further wherein the clock signal and the match signal are multiplexed on said dedicated signal line.

7. The computer system of claim 6, further wherein the clock signal is transmitted during a first time interval and the signal line is monitored for the match signal during a second time interval subsequent to the first time interval, still further wherein a match is indicated by the occurrence of a first state of the clock signal during the first time interval and a second state of the match signal during the second time interval, the second state being different from the first state.

8. The computer system of claim 6, further comprising:

a general purpose input-output GPIO port disposed within the base unit for outputting the clock signal from the base unit to said display panel indicator circuit and for inputting the match signal provided from said display panel indicator circuit on the single dedicated signal line.

9. The computer system of claim 1, wherein said table of display panel IDs further includes an updatable table, capable for updating the table beyond an initial number of panel IDs with additional display panel IDs and corresponding identification characteristics.

10. The computer system of claim 1, further comprising:

video controller for selecting appropriate boot-up information from a system memory in response to an obtained display panel identification characteristics, the boot-up information for use by said video controller during the booting up of the notebook computer, further for use in establishing appropriate control signals for the driving of the display panel identified by the display panel ID.

11. A notebook computer system having a base unit, a display panel, and display panel indication for identifying the display panel, said computer system comprising:

a table of display panel IDs and corresponding display panel identification characteristics stored within the base unit, the identification characteristics including a type, resolution, and manufacturer;

a display panel indicator circuit for being disposed with the display panel, said display panel indicator including a panel ID unique to the type, resolution, and manufacturer of the display panel, wherein the panel ID includes a prescribed count, said display panel indicator circuit further including a counter and a comparator, the comparator for comparing a count of the counter with the prescribed panel ID count;

means for providing a clock signal of high and low states from the base unit to said display panel indicator circuit while simultaneously monitoring a clock signal count within the base unit, wherein the clock signal is utilized by said display panel indicator circuit as an input to the display panel indicator circuit counter to count from an initial count and wherein the count of the display panel indicator circuit counter is compared with the prescribed panel ID count using the display panel indicator circuit comparator, wherein a signal is output to the base unit indicative of a count match upon the counter count becoming equal to the panel ID count; and means for disabling the providing of the clock signal from the base unit to said display panel indicator circuit upon a recognition of the match signal by the base unit, and using the monitored clock signal count within the base unit for accessing a corresponding panel ID in said table of display panel ID, further for obtaining corresponding display panel identification characteristics.

12. The computer system of claim 11, wherein the counter of said display panel indicator circuit includes an n-bit counter having an output and the comparator of said display panel indicator circuit includes an n-bit comparator, the output of the n-bit counter being a first input to the comparator and the prescribed panel ID count being a second n-bit input to the comparator.

13. The computer system of claim 12, further including:

means for resetting the n-bit counter to an initial state upon the occurrence of a match output by the n-bit comparator.

14. The computer system of claim 11, further comprising:

a first dedicated signal line for providing the clock signal from the base unit to said display panel indicator circuit; and a second dedicated signal line for providing the match signal from said display panel indicator circuit, said second dedicated signal line being different from said first dedicated signal line.

15. The computer system of claim 14, still further comprising:

a first general purpose input-output GPIO port in the base unit for outputting the clock signal from the base unit to said display panel indicator circuit on said first dedicated signal line, and a second general purpose input-output GPIO port in the base unit for inputting the match signal provided from said display panel indicator circuit on said second dedicated signal line.

16. The computer system of claim 11, further comprising:

a dedicated signal line for providing the clock signal from the base unit to said display panel indicator circuit and further for providing the match signal from said display panel indicator circuit to the base unit, further wherein the clock signal and the match signal are multiplexed on said dedicated signal line.

17. The computer system of claim 16, further wherein the clock signal is transmitted during a first time interval and the signal line is monitored for the match signal during a second time interval subsequent to the first time interval, still further wherein a match is indicated by the occurrence of a first state of the clock signal during the first time interval and a second state of the match signal during the second time interval, the second state being different from the first state.

18. The computer system of claim 16, further comprising:

a general purpose input-output GPIO port disposed within the base unit for outputting the clock signal from the base unit to said display panel indicator circuit and for inputting the match signal provided from said display panel indicator circuit on the single dedicated signal line.

19. The computer system of claim 11, wherein said table of display panel IDs further includes an updatable table, capable for updating the table beyond an initial number of panel IDs with additional display panel IDs and corresponding identification characteristics.

20. The computer system of claim 11, further comprising:

means for selecting appropriate boot-up information from a system memory in response to an obtained display panel identification characteristics, the boot-up information for use by a video controller during the booting up of the notebook computer, further for use in establishing appropriate control signals for the driving of the display panel identified by the display panel ID.

21. A method for identifying a display panel of a notebook computer, the notebook computer including a base unit, said method comprising the steps of:

providing a table of display panel IDs and corresponding display panel identification characteristics stored within the base unit, the identification characteristics including a type, resolution, and manufacturer;

providing a display panel indicator circuit for being disposed with the display panel, the display panel indicator including a panel ID unique to the type, resolution, and manufacturer of the display panel, wherein the panel ID includes a prescribed count, the display panel indicator circuit further including a counter and a comparator, the comparator for comparing a count of the counter with the prescribed panel ID count;

providing a clock signal of high and low states from the base unit to the display panel indicator circuit while simultaneously monitoring a clock signal count within the base unit;

utilizing the clock signal by the display panel indicator circuit as an input to the display panel indicator circuit counter to count from an initial count;

comparing the count of the display panel indicator circuit counter with the prescribed panel ID count using the display panel indicator circuit comparator and outputting a signal to the base unit indicative of a count match upon the counter count becoming equal to the panel ID count; and upon a recognition of the match signal by the base unit, disabling the providing of the clock signal from the base unit to the display panel indicator circuit and using the monitored clock signal count within the base unit for accessing a corresponding panel ID in the table of display panel ID and obtaining corresponding display panel identification characteristics.

22. The method of claim 21, wherein the counter of the display panel indicator circuit includes an n-bit counter having an output and the comparator of the display panel indicator circuit includes an n-bit comparator, the output of the n-bit counter being a first input to the comparator and the prescribed panel ID count being a second n-bit input to the comparator.

23. The method of claim 22, further including the step of:

resetting the n-bit counter to an initial state upon the occurrence of a match output by the n-bit comparator.

24. The method of claim 21, wherein the clock signal is provided from the base unit to the display panel indicator circuit using a first dedicated signal line, and the match signal is provided from the display panel indicator circuit using a second dedicated signal line different from the first dedicated signal line.

25. The method of claim 24, wherein the base unit further includes a first general purpose input-output GPIO port for outputting the clock signal from the base unit to the display panel indicator circuit on the first dedicated signal line, and the base unit further includes a second general purpose input-output GPIO port for inputting the match signal provided from the display panel indicator circuit on the second dedicated signal line.

26. The method of claim 21, wherein the clock signal is provided from the base unit to the display panel indicator circuit using a dedicated signal line, and the match signal is provided from the display panel indicator circuit using the dedicated signal line, further wherein the clock signal and the match signal are multiplexed on the dedicated signal line.

27. The method of claim 26, further wherein the clock signal is transmitted during a first time interval and the signal line is monitored for the match signal during a second time interval subsequent to the first time interval, still further wherein a match is indicated by the occurrence of a first state of the clock signal during the first time interval and a second state of the match signal during the second time interval, the second state being different from the first state.

28. The method of claim 26, wherein the base unit further includes a general purpose input-output GPIO port for outputting the clock signal from the base unit to the display panel indicator circuit and for inputting the match signal provided from the display panel indicator circuit on the single dedicated signal line.

29. The method of claim 21, wherein providing the table of display panel IDs further includes providing an up datable table for updating the table beyond an initial number of panel IDs with additional display panel IDs and corresponding identification characteristics.

30. The method of claim 21, further comprising the steps of:

selecting appropriate boot-up information from a system memory in response to the obtained display panel identification characteristics, the boot-up information for use by a video controller during the booting up of the notebook computer, further for use in establishing appropriate control signals for the driving of the display panel identified by the display panel ID.

* * * * *